US010557711B2

(12) United States Patent
Lee et al.

(10) Patent No.: US 10,557,711 B2
(45) Date of Patent: Feb. 11, 2020

(54) APPARATUS FOR INFERRING PEDESTRIAN POSITION BASED ON PEDESTRIAN MOVEMENT DETECTION, AND METHOD THEREFOR

(71) Applicant: KOREA INSTITUTE OF SCIENCE AND TECHNOLOGY, Seoul (KR)

(72) Inventors: Taik Jin Lee, Seoul (KR); Seok Lee, Seoul (KR); Sun Ho Kim, Seoul (KR); Jae Hun Kim, Busan (KR); Beom Ju Shin, Seoul (KR); Chul Ki Kim, Samcheok-si (KR); Young Min Jhon, Seoul (KR)

(73) Assignee: Korea Institute of Science And Technology, Seongbuk-gu, Seoul (KR)

( * ) Notice: Subject to any disclaimer, the term of this patent is extended or adjusted under 35 U.S.C. 154(b) by 679 days.

(21) Appl. No.: 14/429,162

(22) PCT Filed: Sep. 12, 2013

(86) PCT No.: PCT/KR2013/008250
§ 371 (c)(1),
(2) Date: Jun. 4, 2015

(87) PCT Pub. No.: WO2014/046419
PCT Pub. Date: Mar. 27, 2014

(65) Prior Publication Data
US 2015/0308831 A1 Oct. 29, 2015

(30) Foreign Application Priority Data
Sep. 21, 2012 (KR) .................. 10-2012-0105371

(51) Int. Cl.
*G01C 22/00* (2006.01)
*G01C 21/12* (2006.01)
*G01B 21/00* (2006.01)

(52) U.S. Cl.
CPC ............ *G01C 21/12* (2013.01); *G01B 21/00* (2013.01); *G01C 22/006* (2013.01)

(58) Field of Classification Search
USPC ........................................................ 702/160
See application file for complete search history.

(56) References Cited

U.S. PATENT DOCUMENTS

| 8,447,272 | B2 * | 5/2013 | Faith ................. G06Q 30/0201 455/410 |
| 2008/0120062 | A1 * | 5/2008 | Lee ...................... G01C 22/006 702/160 |
| 2012/0136573 | A1 * | 5/2012 | Janardhanan ........ G01C 21/165 701/512 |

FOREIGN PATENT DOCUMENTS

| JP | 09-89584 A | 4/1997 |
| JP | 0989584 A | 4/1997 |

(Continued)

OTHER PUBLICATIONS

Japanese Office Action dated Mar. 25, 2016; Appln. No. 2015-532951.

(Continued)

*Primary Examiner* — Lam S Nguyen

(57) ABSTRACT

Disclosed are an apparatus for estimating a pedestrian position based on pedestrian motion recognition, and a method therefor. The method for estimating the pedestrian position based on pedestrian motion recognition includes recognizing a specific motion of a plurality of motions of the pedestrian, performing a unique pedestrian dead-reckoning (PDR) technique corresponding to the recognized specific motion among unique PDR techniques for each of the plurality of motions of the pedestrian, and estimating the pedestrian's position by the performed unique PDR technique.

13 Claims, 9 Drawing Sheets

(56) References Cited

FOREIGN PATENT DOCUMENTS

| JP | 2004-138513 A | 5/2004 |
|----|---------------|--------|
| JP | 2009-168792 A | 7/2009 |
| KR | 20090061019 A | 6/2009 |
| KR | 20110027250 A | 3/2011 |
| WO | 2008/035827 A1 | 3/2008 |
| WO | 2010/007765 A1 | 1/2010 |
| WO | 2010/073684 A1 | 7/2010 |

OTHER PUBLICATIONS

Seung Hyuck Shin, et al; "Phone Location Classification Based on MEMS Inertial Sensor", The 17th GNSS Workshop, Nov. 2010, 4 pages.
International Search Report dated Nov. 13, 2013; PCT/KR2013/008250.

* cited by examiner

APPARATUS FOR INFERRING PEDESTRIAN POSITION BASED ON PEDESTRIAN MOVEMENT DETECTION, AND METHOD THEREFOR

TECHNICAL FIELD

The present invention relates to an apparatus for estimating a pedestrian position through pedestrian motion recognition and a method thereof, and more particularly, to an enhanced apparatus for estimating a pedestrian position using pedestrian motion information based on pedestrian motion recognition using pattern recognition and a method thereof.

BACKGROUND ART

There are various methods of determining a position of specific coordinates on three-dimensions. As an example of the representative method, there is a radar tracking recognition system that may determine coordinates of one point on three-dimensions using an azimuth, elevation, and a distance.

Meanwhile, a global positioning system (hereinafter, referred to as "GPS") that has been originally developed for military purposes has been used in a variety of fields as military or civilian purposes, as the use of GPS satellites has been also opened to civilians. The GPS has been utilized in a wide variety of fields such as automatic navigation systems for vehicles, ships, aircraft, or the like, various services (for example: NATE or magicN) used to determine positions of children, the elderly, friends, or the like provided by mobile carriers, strike of advanced guided weapons (Tomahawk missiles), movement of ground troops, and the like. Here, in order to determine accurate position information, GPS signals should be respectively received from mutually different satellites (at least three satellites).

However, the GPS signals have weak signal strength, and are hampered by special circumstances such as ionosphere of the atmosphere until the GPS signals are transmitted to a GPS receiver on the Earth's surface from the satellites in the universe, tunnels, overpasses, and the like. That is, absolute coordinates (three-dimensional (3D) position coordinates and the time) provided by the GPS signals are highly likely to have an error.

Thus, methods for correcting the error have been developed.

In a case of location based service (LBS), the absolute coordinates may be transmitted from the GPS satellites and the error of the position information may be corrected by searching multiple paths using data stored within a server. In a case of differential-GPS (D-GPS), a standard GPS receiver may be installed in a specific place, and the error of the position information of a moving GPS receiver may be corrected by comparing an accurate position of the standard GPS receiver and data of the moving GPS receiver.

However, when the moving GPS receiver (in practice, a mobile terminal equipped with the moving GPS receiver) is moved to an environment in which the GPS signals cannot be received such as in an underground parking lot, the inside of a building, an overpass, a tunnel, or the like or the GPS signals can be received from only three satellites or less, there is a problem that cannot obtain current position information.

In addition, when using only the absolute coordinates provided by the GPS signals, an error range reaches several tens of meters to several hundred meters, and therefore there is a problem that cannot provide accurate position information.

In particular, in recent years, an indoor navigation field that estimates a pedestrian position indoors has attracted attention.

The GPS signals are hardly received by the walls of the building in such an indoor environment, and therefore the GPS technology cannot be used in the indoor navigation field.

Thus, in order to solve this problem, a pedestrian position estimation method using a micro electro mechanical system (MEMS) sensor module and a pedestrian position estimation method using a mobile device have been conventionally proposed.

First, the pedestrian position estimation method using the MEMS sensor module is basically based on a pedestrian dead-reckoning (PDR) technique, that is, a technique that continuously estimates a position of a pedestrian by estimating the number of steps, a gait, and a direction of the pedestrian. The MEMS sensor module is fixed and attached to a part of the body such as head, legs, or waist of the pedestrian so that the axis of the sensor module is fixed, and therefore noise according to the motion of the pedestrian is small and the direction is fixed, resulting in facilitating to perform the PDR. However, the pedestrian position estimation method using the MEMS sensor module has a quite inconvenient drawback because the sensor module should be attached to the body and signals from the sensor module should be received and processed through specific equipment.

Meanwhile, with the launch of the latest high-performance mobile devices, the hardware performance has been improved and a variety of sensors have been built in the mobile devices. A method in which this trend is reflected is the pedestrian position estimation method using the mobile device.

However, in the pedestrian position estimation method using the mobile device, when a pedestrian moves while carrying the mobile device, the axis of the mobile device is moved according to the motion of the pedestrian unlike the MEMS sensor module. In general, the pedestrian moves while holding the mobile device in one hand or putting in a pocket, and therefore a lot of unnecessary noise occurs. In addition, the sensors built in the mobile device have lower performance than that of the MEMS sensor.

Due to these problems, only through the PDR technique using the existing MEMS sensor module, there are difficulties in estimating a pedestrian position using the mobile device.

DISCLOSURE

Technical Problem

The present invention is directed to providing an apparatus for estimating a pedestrian position through pedestrian motion recognition that may naturally estimate a pedestrian position regardless of unspecified behavioral patterns or motions of a pedestrian carrying a mobile device indoors and provide position information to the pedestrian in real time, and a method thereof.

Technical Solution

One aspect of the present invention provides a method for estimating a pedestrian position based on pedestrian motion recognition, including: recognizing a specific motion of a plurality of motions of a pedestrian; performing a unique pedestrian dead-reckoning (PDR) technique corresponding to the recognized specific motion among unique PDR techniques for each of the plurality of motions; and estimating a position of the pedestrian by the performed unique PDR technique.

The recognizing the specific motion of the plurality of motions of the pedestrian may include recognizing the specific motion of the plurality of motions of the pedestrian by pattern recognition based on signals from sensors built in a user terminal.

The plurality of motions of the pedestrian may include stopping, walking, running, answering a phone, and walking while putting the terminal in a pocket.

The pattern recognition may be a cloud method using a server or a method of the terminal itself.

The unique PDR technique may be performed in the order of estimation of the number of steps, stride estimation, and direction estimation.

Still another aspect of the present invention provides an apparatus for estimating a pedestrian position based on pedestrian motion recognition, including: a program, wherein the program includes a plurality of unique PDR algorithms corresponding to each of a plurality of motions of a pedestrian, and a unique PDR technique corresponding to a recognized specific motion among the plurality of motions of the pedestrian is performed according to the recognized specific motion among the plurality of motions of the pedestrian.

Advantageous Effects

According to the present invention, through a pedestrian dead-reckoning (PDR) enhanced method that accurately estimates a position of a pedestrian by performing each PDR according to motions recognized by using a motion recognition technique, it is possible to accurately estimate the position of the pedestrian.

MODES OF THE INVENTION

Hereinafter, preferred embodiments of the present disclosure will be described in detail with reference to the accompanying drawings. Prior to the description, it should be understood that the terms used in the specification and the appended claims should not be construed as limited to general dictionary meanings, but interpreted based on the meanings and concepts corresponding to technical aspects of the present disclosure on the basis of the principle that the inventor is allowed to define terms appropriately for the best explanation. Therefore, the description proposed herein is merely a preferable example for the purpose of illustration only, not intended to limit the scope of the disclosure, and thus it should be understood that other equivalents and modifications could be made thereto without departing from the spirit and scope of the disclosure.

The present invention relates to a method of estimating a position of a pedestrian by recognizing a specific motion of the pedestrian using pattern recognition and performing a pedestrian dead-reckoning (PDR) technique according to each motion.

Pedestrian Motion Recognition

When a pedestrian moves while carrying a mobile device indoors, a variety of motions may be generated. As examples of the variety of motions, stopping, walking, running, answering a phone, walking while putting a mobile device in a pocket, and the like may be given.

Figure 1:
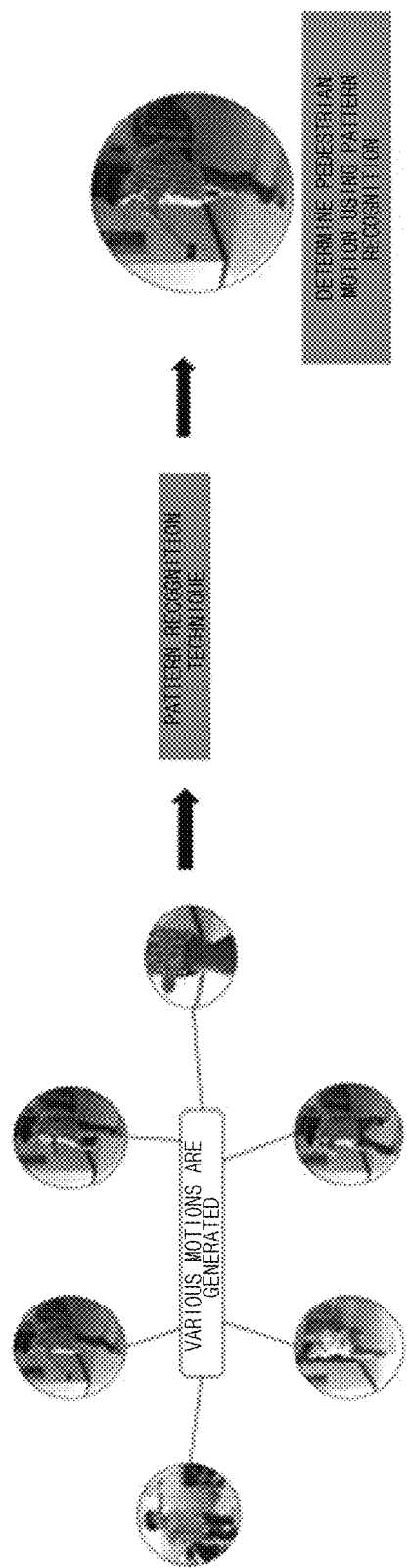
FIG. 1 is a conceptual diagram illustrating a pedestrian motion recognition technique according to the present invention.

Recognition of a specific motion among the variety of motions may use pattern recognition. That is, based on accumulated signal patterns for each motion, it can be seen, when a specific signal pattern is generated, that the generation of the specific signal pattern corresponds to the specific motion, and therefore the specific motion of the pedestrian may be recognized using pattern recognition (see FIG. 1).

Such pattern recognition may be classified into a cloud method using a server and a method of a terminal itself.

Figure 2:
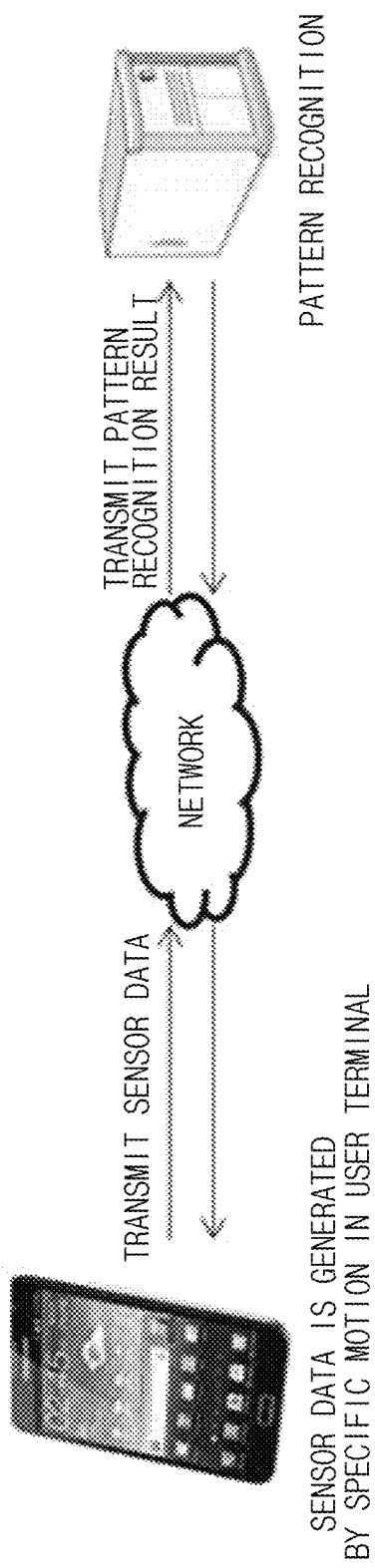
FIG. 2 is a conceptual diagram illustrating data transmission for a pedestrian motion recognition technique according to the present invention.

As an example, as shown in FIG. 2, sensor data caused by a specific motion of a user is first generated from a variety of sensors built in a user terminal such as a mobile device. The generated sensor data is transmitted to a server through a network, and the server performs pattern recognition and then transmits results of such pattern recognition to the user again through the network.

Application of PDR Technique Using Motion Information

The specific motion of the pedestrian may be recognized using the above-described pattern recognition.

Figure 3:
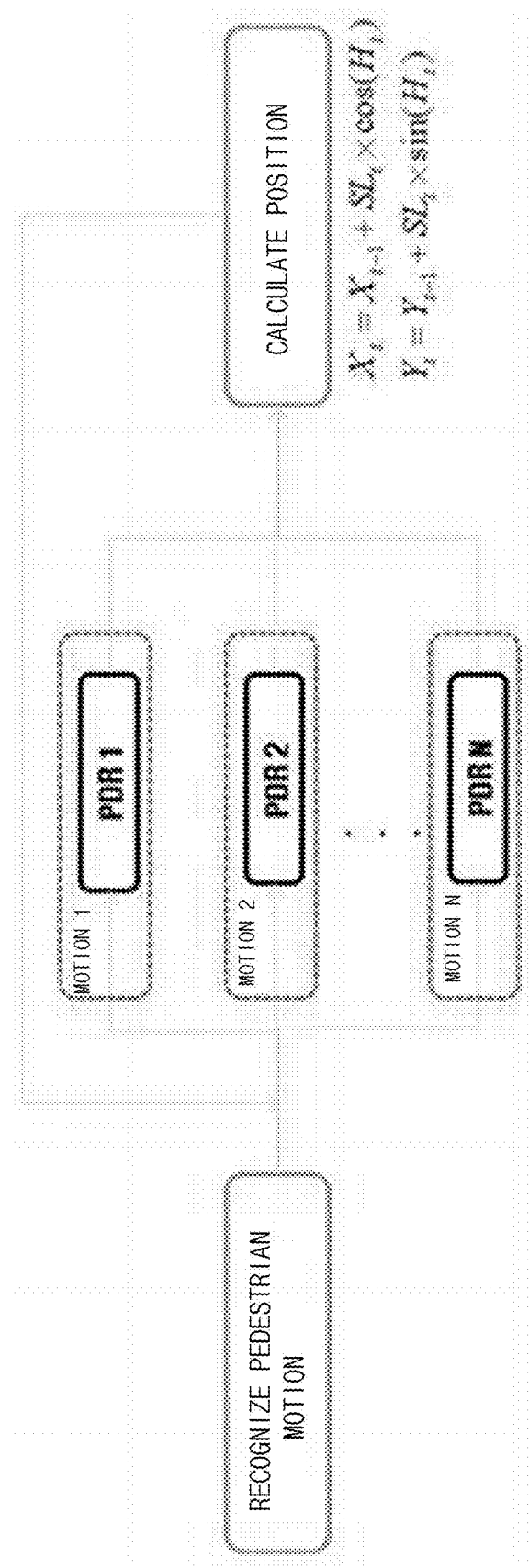
FIG. 3 is a conceptual diagram illustrating pedestrian dead-reckoning (PDR) performance using pedestrian motion information according to the present invention.
Figure 4:
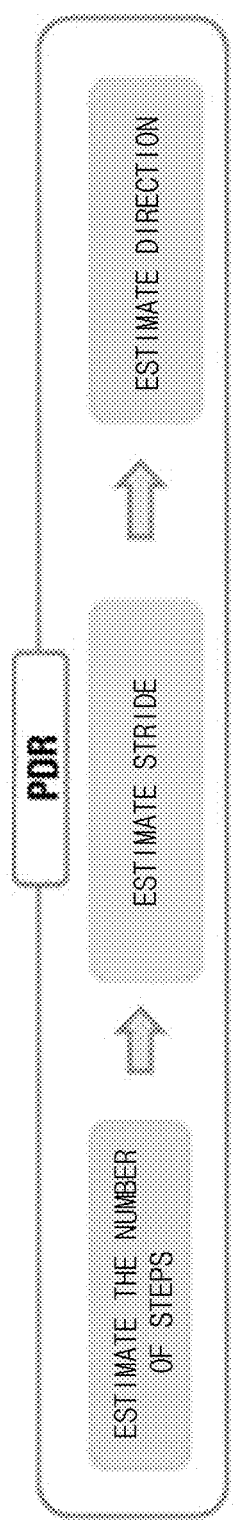
FIG. 4 is a block diagram illustrating detailed PDR performance according to the present invention.

FIG. 3 is a conceptual diagram illustrating an enhanced method of a PDR technique using pedestrian motion information.

That is, as shown in FIG. 3, when the motion of the pedestrian is recognized through pattern recognition, a unique PDR algorithm according to each pedestrian motion is performed, whereby an accurate position of the pedestrian may be calculated.

An apparatus for estimating a pedestrian position may include a plurality of (N) unique PDR algorithms corresponding to each of a plurality of motions of the pedestrian, and a unique PDR technique corresponding to a recognized specific motion among the plurality of motions of the pedestrian may be performed according to the recognized specific motion among the plurality of motions of the pedestrian.

Basically, each of the PDR techniques may be performed in the order of estimation of the number of steps, stride estimation, and direction estimation, which will be described below.

Figure 5:
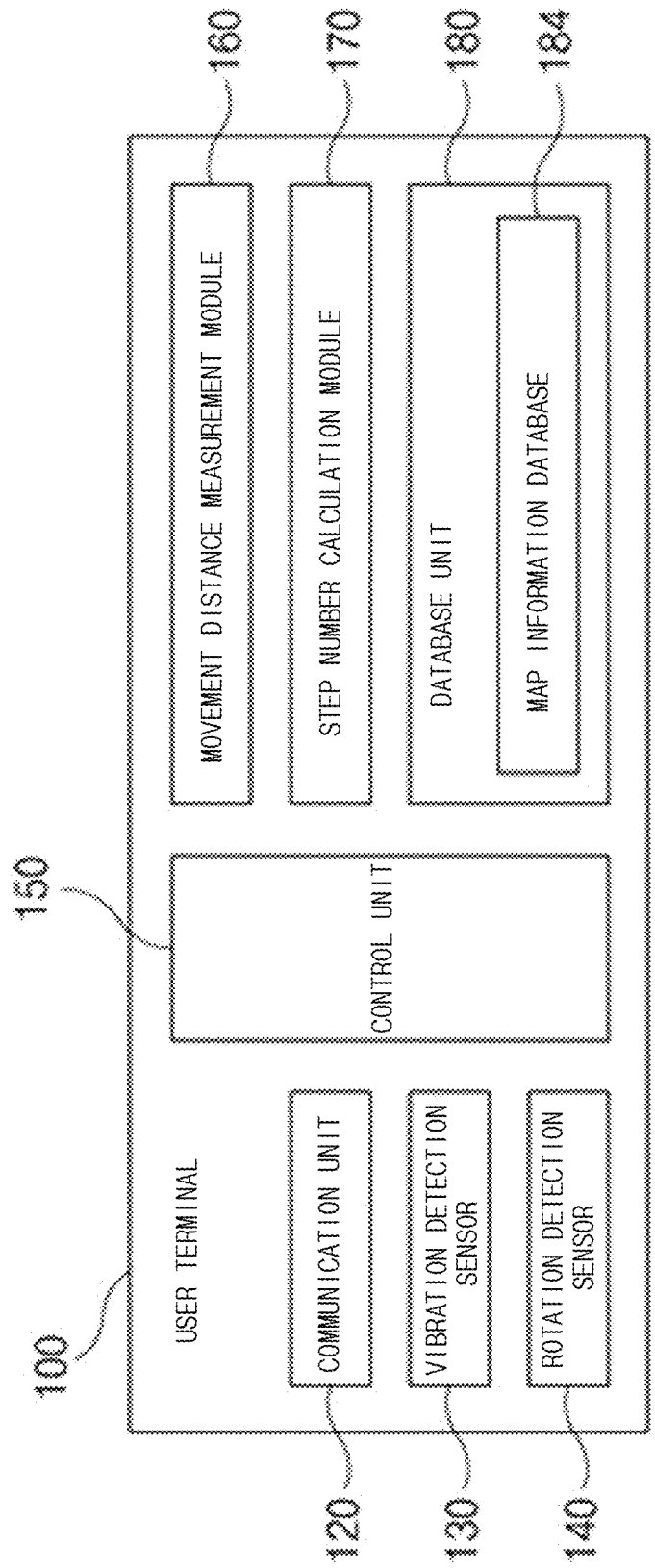
FIG. 5 is a block diagram illustrating a structure of a position estimation apparatus according to an embodiment of the present invention.

FIG. 5 is a block diagram illustrating a structure of a position estimation apparatus according to an embodiment of the present invention. As shown in FIG. 5, a user terminal 100 for position estimation may include a communication unit 120, a vibration detection sensor 130, a rotation detection sensor 140, a movement distance measurement module 160, step number calculation module 170, and a map information database 184.

When a user is walking, the vibration detection sensor 130 and the rotation detection sensor 140 may detect vibration generated from the user's walking to generate vibration information, and at the same time, detect a walking direction and a walking angle to generate rotation information. In this instance, an acceleration sensor or the like may be used as the vibration detection sensor 130, and a digital compass, a gyroscope, or the like may be used as the rotation detection sensor 140. Obviously, other various kinds of sensors that can detect movements of a user may be used.

The movement distance measurement module 160 measures a movement distance by which a user actually walks so as to correspond to rotation information of the user measured by the rotation detection sensor 140 and geographic information stored in the map information database 184.

The step number calculation module 170 calculates the number of steps by which a user walks by using the movement distance measured by the movement distance measurement module 160 and the vibration information of the user measured by the vibration detection sensor 130.

The stride estimation module 175 estimates a stride of a user by using the movement distance of the user measured by the movement distance measurement module 160 and the number of steps of the user calculated by the step number calculation module 170.

Next, a position estimation module (not shown) estimates a position of a user by using the stride of the user estimated by the stride estimation module 175 and direction information of the user measured by the rotation detection sensor 140. The stride or position of the user estimated through these components may be transmitted to other terminals or servers of carriers through the communication unit 120 provided in the user terminal 100.

As described above, the position estimation apparatus according to the present embodiment includes the movement distance measurement module 160, the step number calculation module 170, and the stride estimation module 175 within the user terminal 100 to directly estimate the stride of the user, but in a state of excluding these components, a system that estimates a stride of a user by transmitting the position information, the vibration information, and the rotation information which are measured by the vibration detection sensor 130 and the rotation detection sensor 140 provided in the user terminal 100 to servers of carriers or a separate server that provides services of estimating the stride may be provided.

Figure 6:
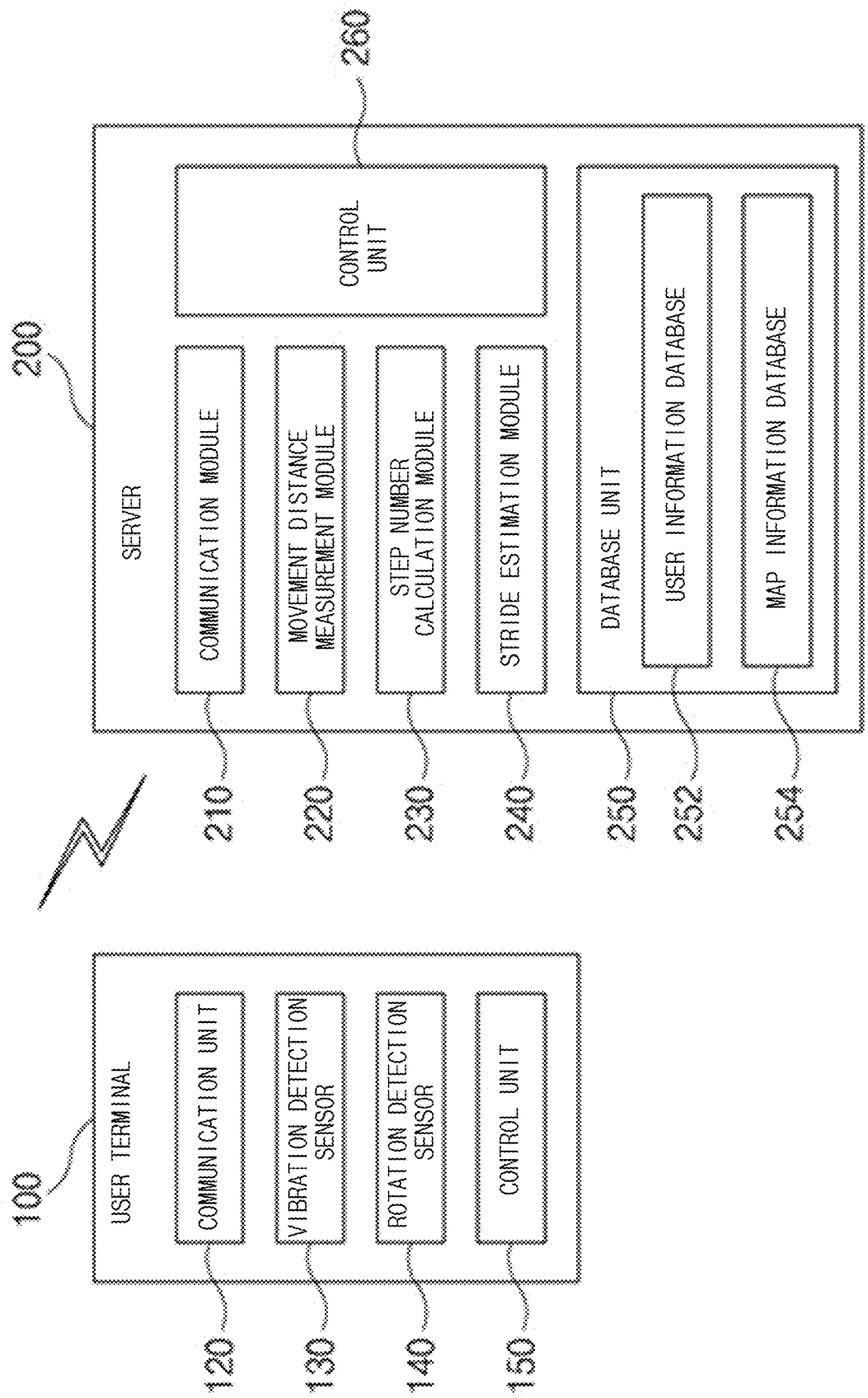
FIG. 6 is a block diagram illustrating a structure of a position estimation system according to an embodiment of the present invention.

FIG. 6 is a block diagram illustrating a structure of a position estimation system according to an embodiment of the present invention.

Referring to FIG. 6, the position estimation system according to the present embodiment may include a communication module 210 that receives position information, vibration information, and rotation information which are measured by a user terminal 100 including a variety of sensors for detecting a movement of a user such as the user's walking, rotation direction, and the like, a database unit 250 that stores personal information of the user and geographic information, a movement distance measurement module 220 that measures a movement distance of the user by using the geographic information stored in the database unit 250 so as to correspond to the rotation information received through the communication module 210 and the position information of the user terminal 100, a step number calculation module 230 that calculates the number of steps of the user corresponding to the vibration information received through the communication module 210 and the measured movement distance, a stride estimation module 240 that estimates a stride of the user by using the movement distance of the user measured by the movement distance measurement module 220 and the number of steps of the user calculated by the step number calculation module 230, and control unit 260 that controls operations of the above-described components. The position estimation system may further include a position estimation module (not shown) that estimates a position of the user by using the stride of the user estimated by the stride estimation module 240 and the rotation information received through the communication module 210.

Here, the user terminal 100 is usually a mobile device that can be carried such as a smart phone, a tablet PC, or the like, and includes the communication unit 120 for transmitting and receiving information to and from a server 200 for estimating a stride.

In addition, the vibration detection sensor 130 and the rotation detection sensor 140 are provided in the user terminal 100, and therefore it is possible detect a walking direction while detecting vibration generated when a user is walking. In this instance, an acceleration sensor or the like may be used as the vibration detection sensor 130, and a digital compass, a gyroscope, or the like may be used as the rotation detection sensor 140. Obviously, other various kinds of sensors that can detect movements of the user may be used.

A control unit 150 controls overall operations of the user terminal 100 such as transmitting walking information of the user detected by the vibration detection sensor 130 and the rotation detection sensor 140 to the communication unit 120 to enable the transmitted walking information to be transmitted to the server 200, and the like.

Meanwhile, the database unit 250 of the server 200 that estimates the stride of the user by receiving position information and movement information of the user from the user terminal 100 may include a user information database 252 that stores personal information of the user such as a name, an age, terminal information, and the like of the user and a map information database 254 that stores geographic information. In the user information database 252, stride information of the user estimated by a stride estimation system according to the present invention is also stored.

The movement distance measurement module 220 measures a movement distance by which a user is actually walking so as to correspond to the position information and rotation information of the user received through the communication module 210 and the geographic information stored in the map information database 254.

The step number calculation module 230 calculates the number of steps by which a user is walking by using the vibration information of the user received through the communication module 210.

In addition, the stride estimation module 240 estimates a stride of a user by using the movement distance of the user measured by the movement distance measurement module 220 and the number of steps of the user calculated by the step number calculation module 230.

Hereinafter, a position estimation method for each motion of a pedestrian according to an embodiment of the present invention will be described.

Figure 7:
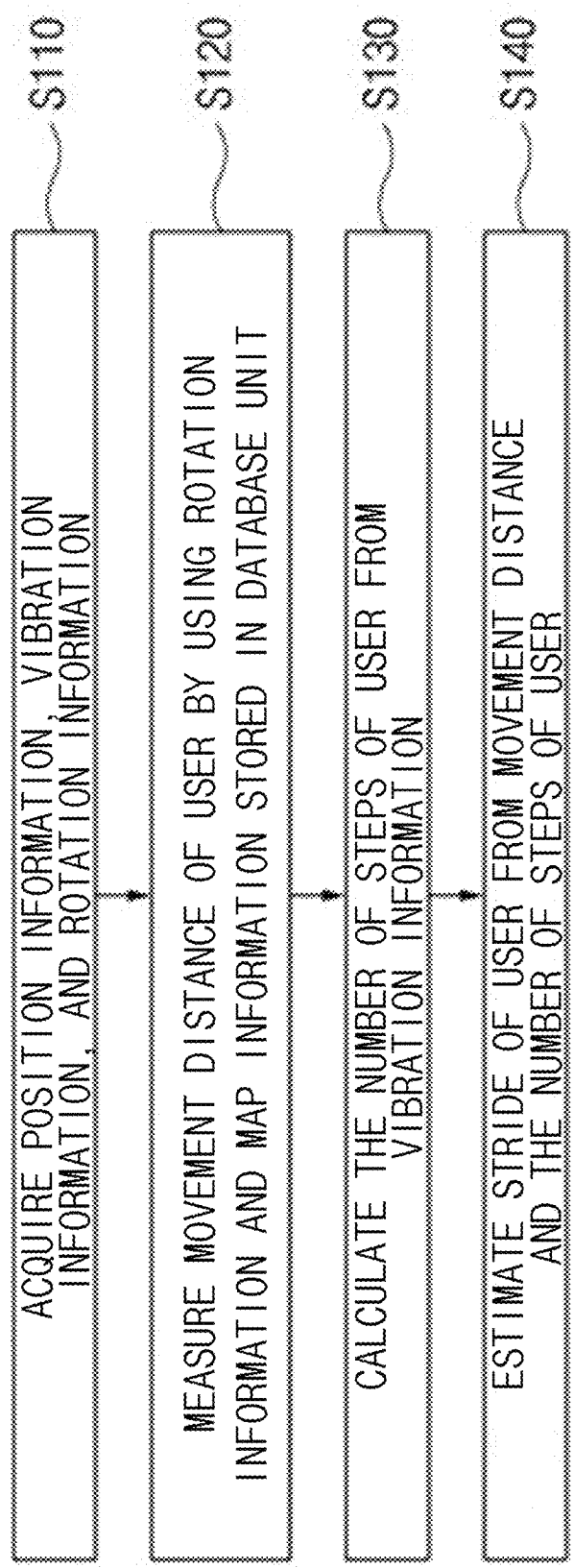
FIG. 7 is a flowchart illustrating a position estimation process according to an embodiment of the present invention.

As shown in FIG. 7, in operation S110, the server 200 receives vibration information and rotation information which are measured by the vibration detection sensor 130 and the rotation detection sensor 140 provided in the user terminal 100 using the communication module 210.

The vibration information and rotation information received through the communication module 210 may be transmitted to each of the modules by the control unit 260, and each of the modules may calculate a movement distance, the number of steps, and a stride of a user by using the received information.

In order to estimate the stride, the movement distance of the user should be first measured.

The movement distance of the user may be measured through various methods, but as an example, in operation S120, a movement distance by which the user is actually walking is measured by using the rotation information transmitted through the user terminal 100 and geographic information stored in the map information database 254 of the database unit 250.

The movement distance of the user may be measured by using a walking direction of the user measured through the rotation information and an actual movement distance of the user obtained by the geographic information.

The rotation information is information that is measured at a point of time when the user turns a corner during walking, and is obtained by measuring a rotation value by using a walking direction measured by a digital compass that is a kind of electronic compasses and an angular speed measured by a gyroscope that is an angular speed sensor.

The movement distance of the user may be measured by using the rotation information measured in this manner, and as an example, rotation information that is measured at a first point of time when the user turns a certain corner and a second point of time when the user turns the following corner may be used as a singular point, and the actual movement distance may be measured by associating the used rotation information with the geographic information stored in the database unit 250.

After the movement distance of the user is measured, the number of steps of the user is calculated by using the vibration information in operation S130.

The number of steps of the user may be calculated from the vibration information received through the communication module 210, and the step number calculation module 230 having received the vibration information through the control unit 260 calculates the number of steps of the user through a graph included in the vibration information.

A variety of methods may be used for calculating the number of steps, but as an example, it is possible to calculate the number of steps of the user by using the form in which a peek or a phase shown in the graph included in the vibration information is repeated.

Figure 8:
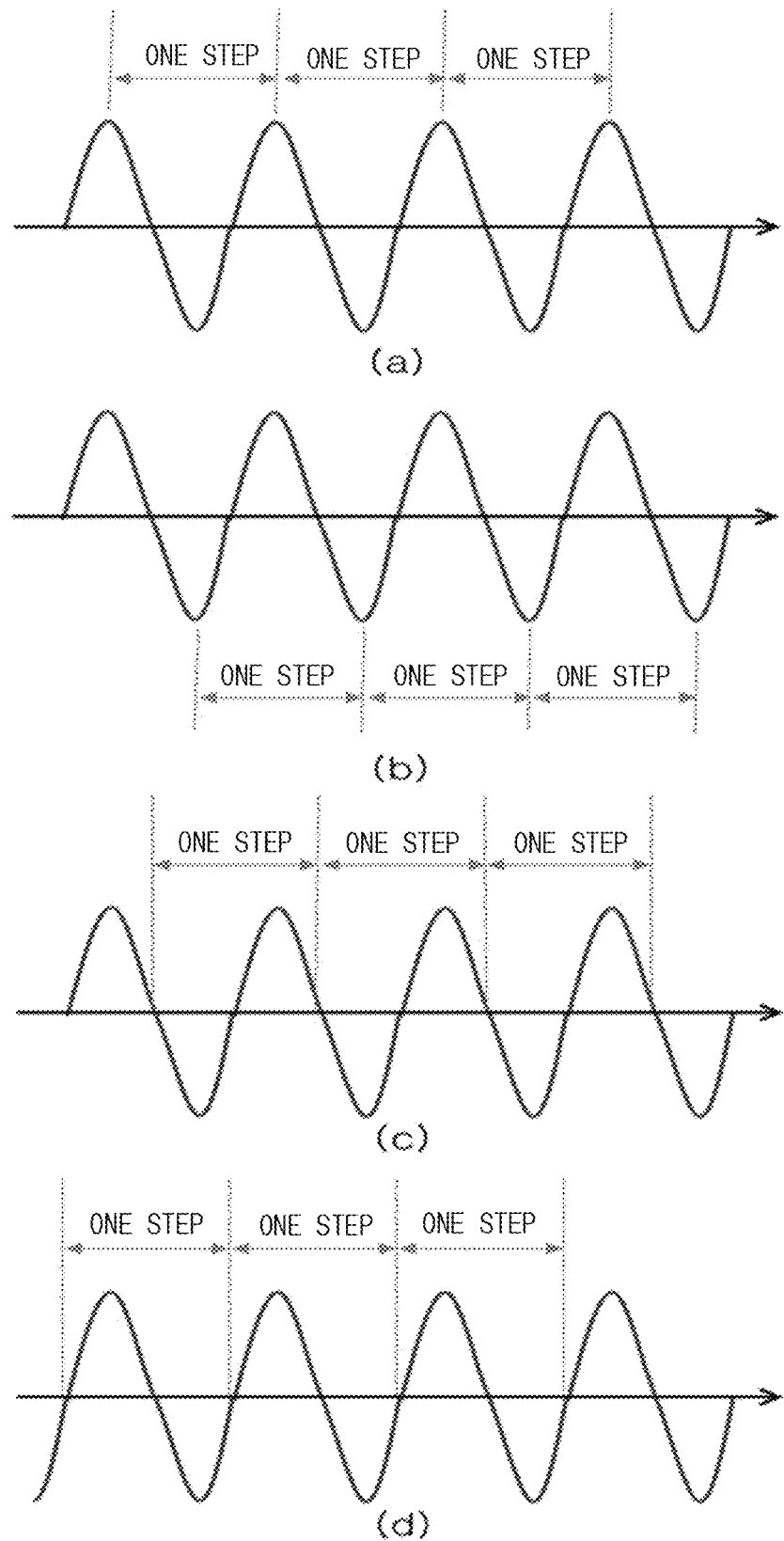
FIG. 8 is a diagram illustrating a process of calculating the number of steps of a user in a position estimation process according to an embodiment of the present invention.
Figure 9:
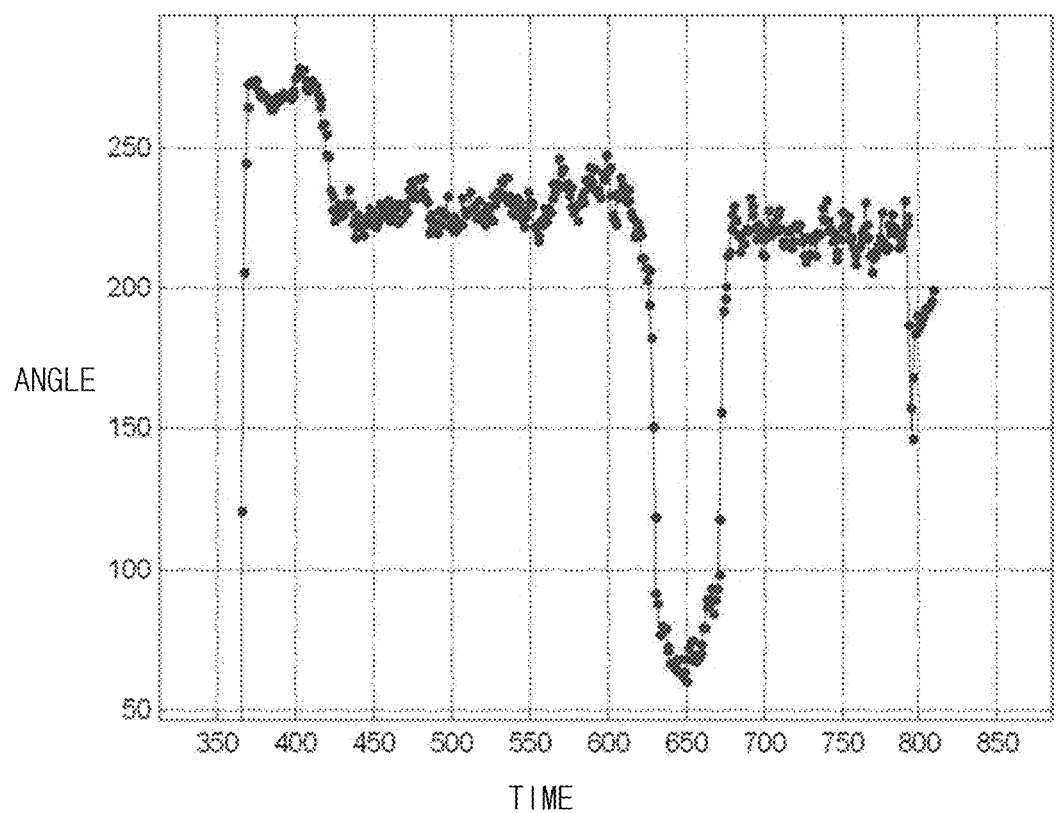
FIG. 9 is a graph illustrating rotation data used in a position estimation process according to an embodiment of the present invention.

As shown in (a) and (b) of FIG. 8, the vibration information is shown in a graphical form, and based on an output waveform provided in the graphical form, a time between maximum values of the output waveform may be recognized as one step or a time between minimum values of the output waveform may be recognized as one step.

In addition, in (c) and (d) of FIG. 8, in order to usually determine the number of steps, a time between points in which the output waveforms cross from a positive value to a negative value may be recognized as one step, or a time between points in which the output waveforms cross from the negative value to the positive value may be recognized as one step.

Next, in operation S140, a stride ($\lambda$) of the user is estimated by using the calculated movement distance (L) of the user and the number of steps (m) of the user.

The stride ($\lambda$) of the user may be estimated by dividing the movement distance (L) of the user measured by the movement distance measurement module 220 by the number of steps (m) of the user calculated by the step number calculation module 230 as shown in the following Equation 1, and in this instance, the calculated stride of the user means an average value in the movement distance, which is referred to as stride estimation.

$$\lambda = \frac{L}{m} \qquad \text{[Equation 1]}$$

In this manner, the stride of the user may be changed depending on the number of steps of the user, and it can be seen that the stride becomes shorter along with an increase in the number of steps in the same movement distance and the stride becomes longer along with a reduction in the number of steps. Through this, it is possible to discern a walking state of the user, and it can be inferred that the user is walking in a hurry when the stride is short and the user is running when the stride is long.

Thus, by repeatedly performing this method, the stride of the user for each circumstance may be averaged and stored in the user information database of the database unit, and therefore it is possible to easily trace a movement speed or a position of the user.

When the stride of the user is estimated in this manner, the position of the user may be traced by using the stride of the user, the rotation information, and the vibration information. In addition, when the position of the user cannot be traced by GPS satellites, it is possible to easily trace the position and movement route of the user through the above-described method.

Meanwhile, the position estimation method according to the present invention has the same basic principle as that of the above-described stride estimation system, except that a movement distance and the number of steps of the user are calculated by using position information, vibration information, and rotation information, which are measured in the user terminal, directly in the user terminal without transmitting the position information, the vibration information, and the rotation information to the corresponding server, and the stride of the user is estimated by using the calculated movement distance and number of steps and geographic information stored in the user terminal.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for estimating a pedestrian position based on pedestrian motion recognition, comprising:
   recognizing a specific motion of a plurality of motions of a pedestrian, wherein the recognizing the specific motion of the plurality of motions of the pedestrian includes recognizing the specific motion of the plurality of motions of the pedestrian by pattern recognition based on signals from a vibration detection sensor and a rotation detection sensor built in a user terminal, and wherein the plurality of motions of the pedestrian include stopping, walking, running, answering a phone, and walking while putting the terminal in a pocket;

estimating a number of steps, a direction, and a stride of the pedestrian based on the recognized specific motion; and estimating a position of the pedestrian by the estimated number of steps, the estimated direction, and the estimated stride, wherein estimating the stride of the pedestrian includes measuring an actual movement distance of the user using geographic information and rotation information by determining rotation information measured at a first point of time when the user turns a certain corner and a second point of time when the user turns a following corner and determining the actual movement distance by associating the rotation information measured at the first point and the rotation information measured at the second point with the geographic information, and estimating a stride of the pedestrian based on the actual movement distance.

2. The method for estimating the pedestrian position of claim 1, wherein the pattern recognition is a cloud method using a server or a method of the terminal itself.

3. The method for estimating the pedestrian position of claim 1, wherein the stride estimation includes
acquiring position information, vibration information, and rotation information of a user,
measuring a movement distance of the user by using the rotation information and geographic information,
calculating the number of steps of the user corresponding to the movement distance of the user by using the vibration information, and
estimating a stride of the user by using the measured movement distance of the user and the number of steps of the user.

4. The method for estimating the pedestrian position of claim 3, wherein the measuring of the movement distance of the user includes
measuring an actual movement distance of the user from the geographic information by using, as a singular point, rotation information measured at a first point of time when the user turns a certain corner and a second point of time when the user turns the following corner.

5. The method for estimating the pedestrian position of claim 3, wherein, based on an output waveform provided in a graphical form included in the vibration information, a time between maximum values of the output waveform is recognized as one step or a time between minimum values of the output waveform is recognized as one step.

6. The method for estimating the pedestrian position of claim 3, wherein the calculating of the number of steps of the user includes recognizing, as one step, a time between points in which the output waveforms cross from a positive value to a negative value, or recognizing, as one step, a time between points in which the output waveforms cross from a negative value to a positive value.

7. The method for estimating the pedestrian position of claim 3, further comprising:
estimating the position of the user by using the stride of the user and the rotation information.

8. The method for estimating the pedestrian position of claim 3, wherein, in the estimating of the stride of the user, a type of the estimated stride of the user includes at least any one of a stride of slow walking, a stride of normal walking, a stride of rapid walking, and a stride of running.

9. An apparatus for estimating a pedestrian position based on pedestrian motion recognition, comprising:
a program,
wherein the program recognizes a specific motion of a pedestrian among a plurality of motions; estimates a number of steps, a direction, and a stride of a pedestrian based on the recognized specific motion of the pedestrian; and estimates a pedestrian position based on the estimated number of steps, the estimated direction, and the estimated stride of the pedestrian,
wherein the recognition of the specific motion of the plurality of motions of the pedestrian is performed by pattern recognition based on signals from sensors built in a user terminal,
wherein estimating the stride of the pedestrian includes measuring an actual movement distance of the user using geographic information and rotation information by determining rotation information measured at a first point of time when the user turns a certain corner and a second point of time when the user turns a following corner and determining the actual movement distance by associating the rotation information measured at the first point and the rotation information measured at the second point with the geographic information, and estimating a stride of the pedestrian based on the actual movement distance.

10. The apparatus for estimating the pedestrian position of claim 9, wherein the pattern recognition is a cloud method using a server or a method of the terminal itself.

11. The apparatus for estimating the pedestrian position of claim 10, wherein the stride estimation is performed by
a vibration detection sensor that detects vibration information from the user's walking,
a rotation detection sensor that detects rotation information from the user's walking,
a database unit that stores geographic information,
a movement distance measurement module that measures a movement distance of the user by using the rotation information and the geographic information,
a step number calculation module that calculates the number of steps of the user by using the vibration information,
a stride estimation module that estimates a stride of the user by using the movement distance of the user measured in the movement distance measurement module and the number of steps of the user calculated in the step number calculation module, and
a control unit that controls operations of the database unit, the movement distance measurement module, the step number calculation module, and the stride estimation module.

12. The apparatus for estimating the pedestrian position of claim 11, further comprising: a position estimation module that estimates the position of the user by using the stride of the user estimated in the stride estimation module, the vibration information, and the rotation information.

13. The apparatus for estimating the pedestrian position of claim 11, wherein the stride estimation module classifies types of the strides according to types of output waveforms of the vibration detection sensor, and estimates the stride for each of the classified types of strides.

* * * * *